United States Patent [19]

Lamb

[11] 4,185,407
[45] Jan. 29, 1980

[54] DISPLAY DEVICE

[76] Inventor: Jack W. Lamb, 13561 Sherman Way No. 208, Van Nuys, Calif. 91405

[21] Appl. No.: 728,634

[22] Filed: Oct. 1, 1976

[51] Int. Cl.² ............................................. G02B 27/02
[52] U.S. Cl. ..................................... 40/367; 40/152.2; 40/564
[58] Field of Search ................. 40/63 A, 106.1, 10 A, 40/152.2, 361, 362, 363, 364, 365, 366, 367, 564; 240/2.1, 44; 355/144; 362/97, 98

[56] References Cited

U.S. PATENT DOCUMENTS

| | | | |
|---|---|---|---|
| 1,759,544 | 5/1930 | Croes | 40/10 A |
| 2,282,167 | 5/1942 | Cullman | 362/188 |
| 2,294,444 | 9/1942 | Boroughs | 40/362 |
| 2,501,840 | 3/1950 | Bradford | 40/471 |
| 2,567,561 | 9/1951 | Hoffmann | 362/223 |
| 3,359,669 | 12/1967 | Masters | 40/361 |

FOREIGN PATENT DOCUMENTS 507270  9/1930  Fed. Rep. of Germany .......... 40/10 A Primary Examiner—Louis G. Mancene
Assistant Examiner—Wenceslao J. Contreras
Attorney, Agent, or Firm—John J. Posta, Jr.

[57] ABSTRACT

The present improved display device permits the improved viewing of such specimens as transparent films, both negatives and positives, translucent objects, such as drawings and water-color prints, selected minerals, and opaque objects smaller than the viewing plate of the device.

The device is inexpensive to make and use and operates economically on a low wattage light source. The device includes an open topped box with a light, such as a low wattage electric light, therein. To the top of the box is affixed a translucent display sheet, while a frame which is preferably glassed in, is hingedly connected to overlie the display sheet so that speciments can be easily placed on and removed from the display sheet.

The distance and angle between the light and the display sheet preferably can be varied so as to provide different display effects. In one embodiment, the light is secured at a distance from the center on the box bottom and the sidewalls with attached display sheet are rotated relative thereto.

In another embodiment, the sidewalls telescope to vary the vertical distance of the display sheet from the box bottom.

In a third embodiment, the light is movable on a track above the box bottom. To further enhance the display, the display sheet may be mottled and/or vari-colored, and/or may have built-in light-orienting means.

The device may also have a grid or the like disposed between the display sheet and box bottom to provide a decorative light display. Accordingly, an improved graphic display can be provided in an economical manner.

11 Claims, 6 Drawing Figures

DISPLAY DEVICE

BACKGROUND OF THE INVENTION

1. Field of the Invention

The present invention generally relates to display means and more particularly to lighted display devices.

2. Prior Art

Viewing of such transparent items as colored film positives and negatives require either their projection, as by an expensive complicated projector, screen and the like, which utilizes considerable power and may damage the film, or their viewing either with the naked eye or in a small hand viewer, usually illuminated by a battery powered light which often needs replacement. Neither the projector nor the hand viewer offers leeway in the manner of presentation of such film. Thus, they do not incorporate means to enhance and vary the display, so as to provide improvements therein, all at little expense and with little power consumption.

It would often be desirable to be able to lighten or darken portions of the film on display in order to provide the best viewing results, all without risking damage to the film. Moreover, it would also be desirable to be able to display other attractive items such as art items, for example, water colored items and collector's items, such as selected minerals, stamps, coins, etc. under the best and safest lighting conditions, for both the viewer and the items to be viewed, and with the least expenditure of power.

SUMMARY OF THE INVENTION

The foregoing needs have now been satisfied by the improved display device of the present invention, which is substantially as set forth in the Abstract above. Thus, the device includes means to display various types of items, including transparent, translucent and opaque objects, and means to enhance and vary the lighting thereof so as to maximize the resulting desirable visual effects. This is accomplished in a simple, inexpensive manner, with minimum expenditure of power and with minimum generation of heat and risk of film damage.

The improved display device of the present invention includes an open topped box within which a light is disposed. The top of the box is covered by a translucent display sheet and a frame, preferably filled with a glass pane, overlies the display sheet so as to hold a specimen on the display sheet. The display sheet may be vari-colored, mottled or otherwise arranged to impart an ornamental effect to the specimens placed thereon. A grid or screen may also be disposed in the box above the light so as to create desirable lighting effects, particularly if the light can be moved relative to the display sheet and specimens thereon. This relative movement can be accomplished by telescoping the sides of the box to move the display sheet up or down, or to rotate the sidewalls of the box and thus the display sheet, or to move the light, as on a track above the box bottom.

In any event, the improved display device is adaptable to the full, proper variable, and attractive display of a wide variety of specimens. Further information concerning the same is set forth in the following detailed description and accompanying drawings.

DRAWINGS

DETAILED DESCRIPTION

Figure 1:
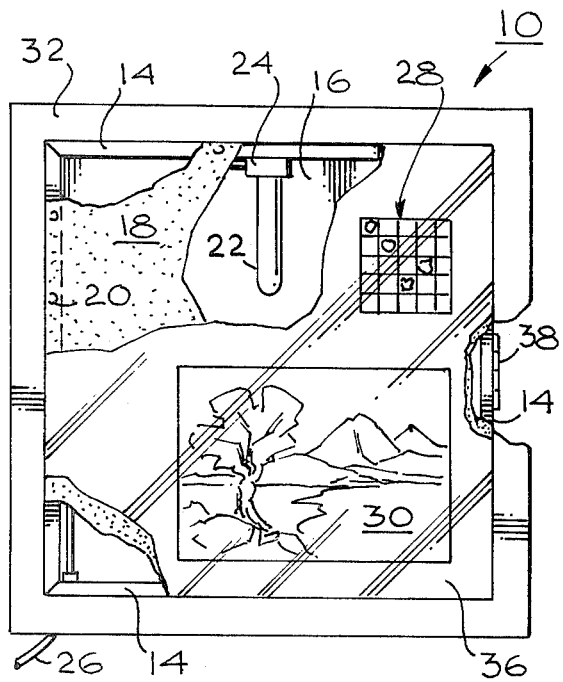
FIG. 1 is a schematic top plan view, partly broken away, of a first preferred embodiment of the improved display device of the present invention.
Figure 2:
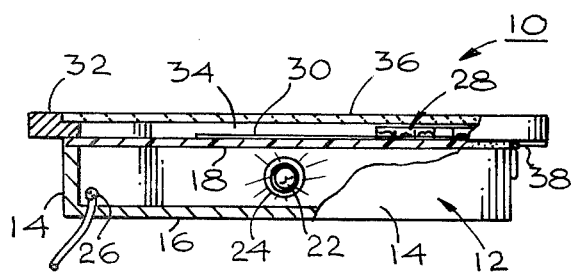
FIG. 2 is a schematic side elevation, partly broken away, of the device of FIG. 1.

FIGS. 1 and 2

Now referring more particularly to the device schematically depicted in FIGS. 1 and 2, an improved lighted display device 10 is shown. Device 10 includes a rectangular box 12 with four upstanding spaced sidewalls 14 joined to a bottom wall. Thus, box 12 may be of metal, plastic, wood or the like and is open topped, the opening being closed, however, by a translucent display sheet 18 of frosted plastic or the like secured to the upper end of sidewalls 14, as by spaced screws 20 or the like.

It is upon display sheet 18 that specimens may be placed for viewing. The light from box 12 diffuses through sheet 18 and enhances the appearance of such speciments.

Box 12 has a low wattage (e.g., 25 watts) light bulb 22 and connector 24 secured to a sidewall 14 below sheet 18 and from which an electrical conduit 26 (cord or the like) extends for connection to an electrical outlet (not shown) to provide the necessary viewing light.

Relatively flat specimens 28, a shallow box containing colored mineral pieces, and flat specimen 30, an exposed colored positive picture film, are shown in FIG. 1 on display sheet 18, held in place and decoratively framed by picture frame 32 having a transparent center section 34 filled with glass or plastic 36. Frame 32 is secured to box 12, as by hinges 38, so that it can be swung away from a position overlying display sheet 18, so as to provide access thereto for placing and removing display specimens 28 and 30 and the like. Thus, device 10 is adapted for the efficient decorative lighted display of those and other specimens.

Device 10 can be used in the position shown in FIGS. 1 and 2, that is, with bottom wall 16 resting on a table surface or the like, or can be tilted for viewing, or hung on a wall with bottom wall 16 against the wall. Since specimens 28 and 30 are pinned between glass 36 and display sheet 18, they stay in place, no matter what orientation device 10 is in. Device 10 is simple, inexpensive and efficient and conserves needed power, since effective lighting is achievable with, for example, a 16 inch by 18 inch frame, with a 15–30 watt bulb.

Figure 3:
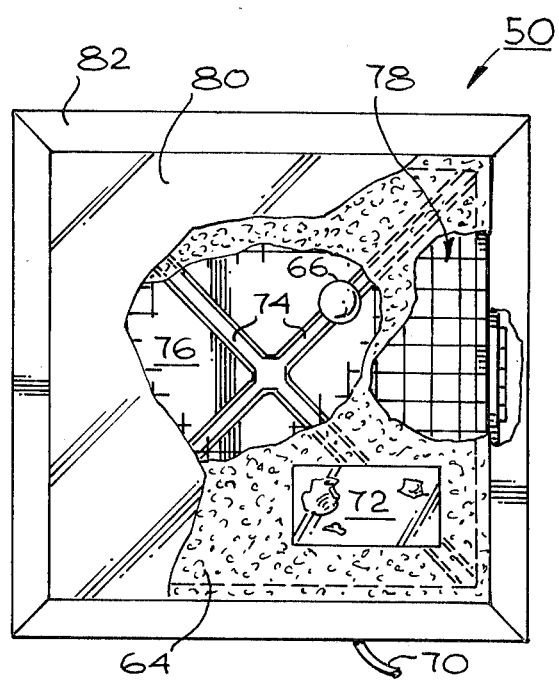
FIG. 3 is a schematic top plan view, partly broken away, of a second preferred embodiment of the improved display device of the present invention.
Figure 4:
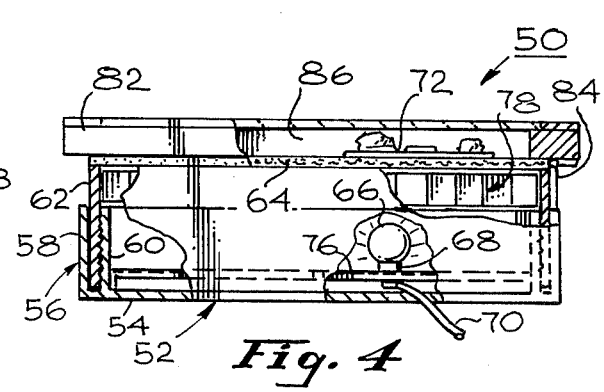
FIG. 4 is a schematic side elevation, partly broken away, of the device of FIG. 3.

FIGS. 3 and 4

A second preferred embodiment of the invention is shown schematically in FIGS. 3 and 4. Thus, an improved display device 50 is shown which includes a generally square box 52 of wood, metal or plastic or the like and comprising a bottom wall 54 and telescopable sidewalls 56. Walls 56 may, for example, include outer walls 58 and inner walls 60, within which intermediate walls 62 are slideably received.

Movement of walls 62 relative to walls 58 and 60 is accomplished by overcoming frictional resistance therebetween so that walls 62 do not merely slide under the force of gravity.

On the upper end of intermediate walls 62 rests a removable translucent display sheet 64 of mottled, multi-colored plastic or the like. An electric light bulb 66 with connector 68 and cord 70 is disposed below sheet 64 in box 52. The vertical distance between sheet 64 with any specimen to be displayed thereon, such as colored picture 72 and light bulb 66 can be varied by raising or lowering sidewalls 62 relative to sidewalls 58 and 60.

The position of light bulb 66 relative to any point on sheet 64 can also be varied by sliding it along one of the interconnected diverging tracks 74 in a sheet 76 of metal, wood, plastic or the like, secured in box 52 parallel to and spaced above bottom wall 54. Bulb 66 is held in tracks 74 by connector 68. Since sheet 64 is removable, access to bulb 66 and tracks 74 is easy.

A light-directing grid 78 of clear, translucent or opaque glass or plastic, or the like, colored or uncolored, may be secured to sidewalls 62 in box 52 above light bulb 66 and below sheet 64 to cast shadows and decorative colors on specimen 72. The shadow and color patterns cast by grid 78 will vary, depending on the position of bulb 66 and the spacing between bulb 66 and display sheet 64.

Specimen 72 is covered by a pane 80 of viewing glass, plastic or the like disposed in a decorative wood, metal or plastic frame 82 hingedly secured, as by hinges 84, to sidewalls 62 of box 52 so as to swing away from specimen 72 when it is desired to replace it on display sheet 64. A gap 86 exists between pane 80 and sheet 64 to permit specimens of various heights to be shown on sheet 64 to the best viewing advantage and for optimum decorative effect. The improved display device 50 thus accomplishes the desired aims of providing in a simple, effective, safe and flexible manner for optimum display of various types of specimens at minimum expense.

Figure 5:
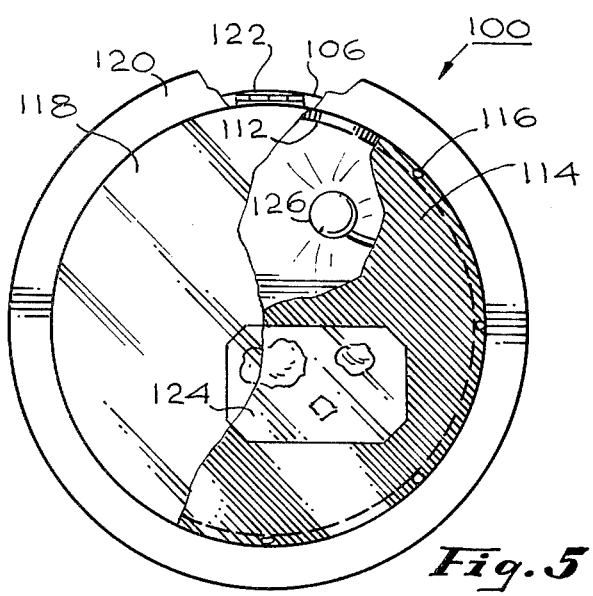
FIG. 5 is a schematic top plan view, partly broken away of a third preferred embodiment of the improved display device of the present invention; and, FIG. 6 is a schematic side elevation of the device of FIG. 5.
Figure 6:
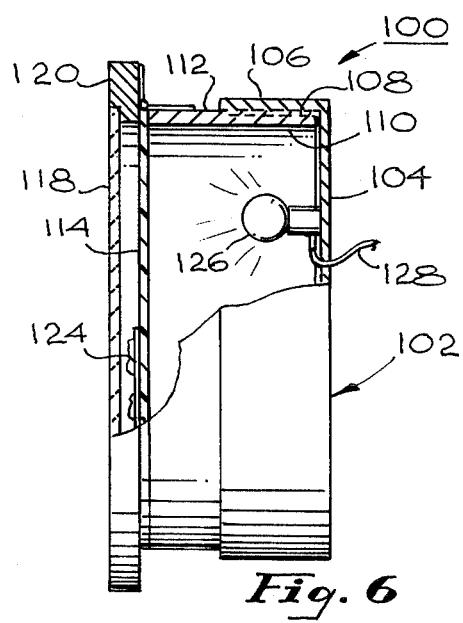

FIGS. 5 and 6

A third embodiment of the improved display device of the present invention is schematically depicted in FIGS. 5 and 6. Thus, a device 100 is shown which includes a cylindrical hollow box 102 having a flat round bottom wall 104 with an upturned peripheral flange 106 therearound. Flange 106 has a spirally threaded inner surface 108 which threadably receives the lower outer threaded portion 110 of cylindrical sidewalls 112 so that sidewalls 112 can rotate relative to bottom wall 104 and can move up and down relative thereto.

To the upper end of sidewalls 112 is affixed a horizontally extending translucent display sheet 114, of plastic, glass, parchment or the like, secured in place by spaced screws 116. Sheet 114 has light-orientating grooves therein for a decorative lighting display effect.

A viewing plate in the form of a pane 118 of clear glass or plastic is disposed in a circular frame 120 of wood, metal or the like over display sheet 114. Frame 120 is hingedly secured, as by hinges to sidewalls 112 so as to pivot from a position overlying display sheet 114 to a position providing access to sheet 114 so as to permit placing of display specimens such as specimen 124 thereon, as shown in FIGS. 5 and 6.

Such specimens are illuminated by an electric light bulb 126 secured in box 102 to bottom wall 104 and connected, as by a line 128, to a power source (not shown). Bulb 126 is positioned off the center line of bottom wall 104 so that rotation and spiraling of sidewalls 112 and display sheet 114 (with objects 124 thereon connected thereto) relative to bottom wall 104 reposition and substantially relight objects 124 from a different angle, so long as objects 124 are spaced from the mid-point of sheet 114.

The light-orientating striations in sheet 114 enhance the changed lighting, thus enabling the most desirable lighting effects to be selected and enabling one to vary the lighting effects as the occasion demands.

Device 100 thus provides a maximum of lighting variability for desired decorative lighting effects, all at a minimum expense. Device 100 is attractive, safe, easy to manufacture and easy and inexpensive to use. Other advantages of device 100, as well as devices 10 and 50, are as set forth in the foregoing.

Various modifications, changes, alternations and additions can be made in the present improved device, its components and their parameters. All such changes, modifications, alterations and additions as are within the scope of the appended claims form part of the present invention.

What is claimed is:

1. An improved display device, said device comprising, in combination:
   a. a hollow container having interconnected sidewalls and bottom wall and an open top;
   b. a light secured in said container and lying in a first plane;
   c. a light-diffusing display sheet disposed on said top and lying in a second plane;
   d. means associated with said container for varying the distance between said first and second planes; and,
   e. a frame connected to said container so as to overlie said display sheet and to be movable therefrom; and,
   f. whereby the light intensity on any given location on said display sheet can readily be varied.

2. The improved display device of claim 1 wherein means are provided to move said light source about said first plane in a vertical and horizontal direction.

3. The improved display device of claim 2 wherein said sidewalls are circular and wherein said bottom wall is circular and includes a portion engaging said sidewalls, whereby said sidewalls are rotatable relative to said bottom wall so as to reposition points on said display sheet relative to said bottom wall.

4. The improved display device of Claim 3 wherein said light is secured to said bottom wall at other than at the approximate center thereof.

5. The improved display device of claim 3 wherein said sidewalls spirally threadably engage said upturned portion of said bottom wall so that the distance between said display sheet and said bottom wall can be varied.

6. The improved display device of claim 5 wherein said light is secured to said bottom wall other than at the approximate center thereof.

7. The improved display device of claim 2 wherein a sheet bearing a plurality of tracks is secured in said container above said bottom wall and supports said light for movement relative thereto.

8. The improved display device of claim 2 wherein said display sheet includes light direction orientation means.

9. The improved display device of claim 8 wherein a light grid is disposed in said container between said light and said display sheet for providing different light patterns, depending on the location of said light.

10. The improved display device of claim 8 wherein said display sheet is multi-colored and translucent.

11. The improved display device of claim 2 wherein said glass is spaced above said display sheet to provide a space within which to display specimens.

* * * * *